United States Patent [19]

Bertoloni et al.

[11] 4,293,843

[45] Oct. 6, 1981

[54] MOTORCAR DASHBOARD

[75] Inventors: Luciano Bertoloni; Edoardo Rogora, both of Milan; Ermanno Cressoni, Garbagnate, all of Italy

[73] Assignee: Alfa Romeo S.p.A., Milan, Italy

[21] Appl. No.: 63,566

[22] Filed: Aug. 3, 1979

[30] Foreign Application Priority Data

Aug. 24, 1978 [IT] Italy ................................ 26977 A/78

[51] Int. Cl.³ .................................................. B60Q 11/00
[52] U.S. Cl. ................................ 340/52 F; 340/366 R; 315/132
[58] Field of Search .................. 340/52 R, 52 F, 53, 340/366 R, 366 F, 27 R; 315/129, 132

[56] References Cited

U.S. PATENT DOCUMENTS 4,109,235  8/1978  Bouthors ............................ 340/52 F
4,194,199  3/1980  Shepherd et al. ................... 340/52 F

FOREIGN PATENT DOCUMENTS 2642506  5/1978  Fed. Rep. of Germany .... 340/52 F
2257194  5/1975  France ............................. 340/52 F

*Primary Examiner*—Alvin H. Waring
*Attorney, Agent, or Firm*—Charles E. Brown

[57] ABSTRACT

A motor car dashboard, which is compact and has a self contained design and is functionally improved in that the scales of measure of certain magnitudes (e.g. Speed) are divided into staggered sectors corresponding to the most common fields of use, and in that it is possible to take immediate digital readouts of the most important physical magnitudes of interest for a motorist on a display screen, it being sufficient to depress a pushbutton which energizes an electronic readout apparatus for each magnitude of interest and causes the display to be shown on said screen.

12 Claims, 3 Drawing Figures

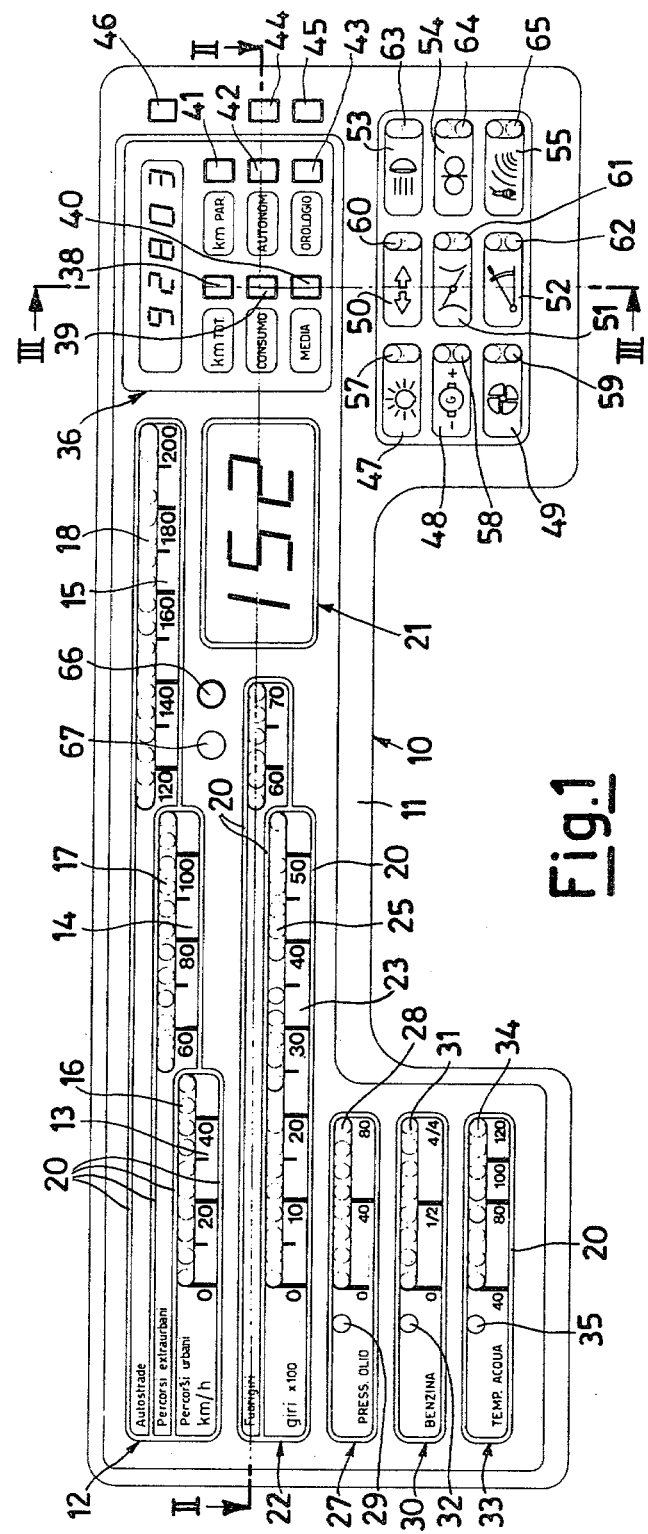

MOTORCAR DASHBOARD

This invention relates to a dashboard for a motor car in which all the instruments are combined which are necessary or useful for the driver according to an arrangement which minimizes the space required by the relative scales and display devices and which at the same time makes possible the immediate and easy reception of the information by the driver, especially as regards the physical magnitudes which are most significant.

In order to afford to the driver the complete control of the vehicle under the different conditions of use, it is useful to have the richest and completest instrument panel available as far as practicable, but very often a tradeoff choice becomes compulsory due to the restricted allotted span on the dashboard before the driver's seat, where the scales and displays of the instrument must be grouped, in order that their readings may be easily accessible to the driver. It is important, in fact, that the readings of the instruments are readily discernible as themselves but it is likewise essential that they be encompassed in a scanning field which makes it possible to check them without having the driver hampered in driving and looking at the road.

To this purpose the dashboard according to the invention is composed by a single panelboard on which there are arranged at least a speedometer scale with its pointer for reading the instantaneous speed of the motor car and the scale of a revolution counter with its pointer for reading the car engine RPM, said dashboard being characterized in that said panelboard has also arranged thereon a first display device which controllably gives the digital readings of the value which is taken from time to time by a series of preselected physical magnitudes as detected by the relevant measuring instruments.

By adopting a single display device for a plurality of measuring instruments a considerable space savings is achieved and a neat and rational outline for the dashboard is obtained, an additional benefit being that of facilitating the finding out of the desired reading.

Having these considerations in mind, the dashboard according to this invention is also characterized in that the scale of the speedometer aforesaid, which is of the bar type, is partitioned into sectors, each of which comprises the graduations of preselected values of the fields of speed of the motor car, the graduations of a sector being arranged staggered relative to those of the previous sector, so that the driver's attention is directed to the sector which contains the instantaneous speed of the motor car.

According to a preferred approach, the partition of the scale into sectors is made according to the criterion of including in each sector the values of the speed which are the most adapted to a certain type of run, for example in town, highway and motorway.

Still with the aim to facilitating finding out the desired indications, the dashboard according to the invention is further characterized in that the scale of the revolution counter, which is of the bar type, is subdivided into sectors, each of which comprises the graduations of the preselected values of the field of the engine RPMs, the graduations of a sector being arranged staggered relative to those of the previous sector, so that the driver's attention is directed to the sector in which the instantaneous engine RPM is included.

The scale of the revolution counter can be subdivided for example in two sectors, one comprising RPMs below the maximum RPM, the other sector comprising the RPMs which exceed the maximum RPM and which thus correspond to an overrunning engine.

Features and advantages of the invention will be better understood by seeing the accompanying drawings, FIGS. 1 to 3, which show by way of nonlimiting example a preferred embodiment of this invention.

FIG. 1 is a front view of the dashboard according to the invention.

Figure 3:
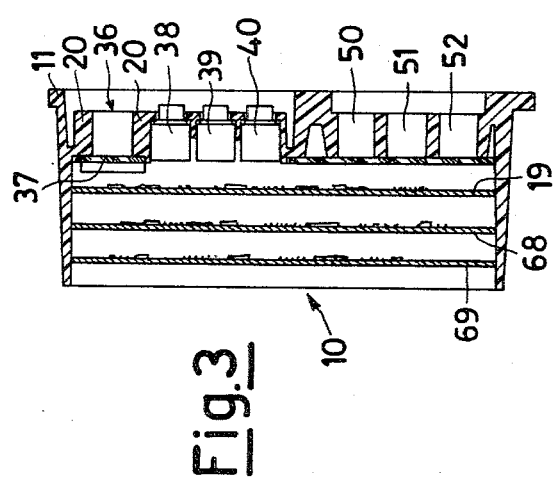
FIG. 3 is a top view in cross-section taken along the line III—III of FIG. 1.

In FIG. 1, 10 generally indicates the dashboard according to the invention: 11 is the panelboard on which are arranged the scales and the display devices of the several measuring instruments.

In the FIG., 12 generally indicates a speedometer scale which is of the bar type and is partitioned into three sectors, indicated at 13, 14 and 15, each of which comprises the graduations of preselected values in the speed field of the motor car: in the case in point the sector 13 comprises the speed values corresponding to in town routes, sector 14 comprises the speed values corresponding to the highway routes and sector 15 comprises the speed values corresponding to motorway routes. The three sectors are arranged staggered with respect to each other so that the driver can readily pinpoint the sector comprising the instantaneous speed of his vehicle and is enabled to check if this speed is adapted to the kind of route he is going on.

In correspondence with the three sectors of the scale 12, there are arranged three series of electrooptical elements (such as luminous diodes or liquid crystals), indicated at 16, 17, 18. The elements, which are lit up in succession and in a variable number, make up a broken line luminous stripe which is the scale pointer and is adapted to define the instantaneous value of the vehicle speed.

At 21 a digital display device is indicated which makes it possible to read out digitally the instantaneous speed of the motor car.

In the drawings, 22 indicates generally the scale of a revolution counter. As shown, the scale 22 is of the bar type and is partitioned into two sectors, indicated at 23 and 24, each of which comprises the graduations of preselected values of the engine RPM: in the example shown herein the sector indicated at 23 comprises the values corresponding to the optimum RPM at which the engine should be run and the sector indicated at 24 comprises the values which indicate to the driver that the engine is overrunning. The two sectors are arranged staggered relative to one another so that the driver has the readout facilitated. In correspondence with the two sectors of the scale 22 there are arranged two sets of optical-electric elements (luminous diodes or liquid crystals) indicated at 25 and 26 which, when lit up, form a luminous stripe adapted to point out the instantaneous value of the engine RPM. At 27 there is indicated the scale of an oil pressure gauge and comprises a set of optical electronic elements 28 which, when lit up, give the value of the oil pressure existing in the engine: a pilot lamp indicated at 29 lights up when the pressure of the oil in the engine drops below a preselected minimum value.

At 30 there is indicated the scale of a fuel level measuring instrument, a strip of optical electronic elements indicated at 31 being lit up to give the value of the level of fuel existing in the motor car fuel tank: when the level goes down and drops below the preselected values a pilot lamp 32 lights up.

At 33 there is indicated the scale of a thermometer for measuring the temperature of the engine coolant: also in correspondence with this scale there is arranged a set of optical electronic elements indicated at 34 and which, by being lit up, from a luminous stripe adapted to indicate the instantaneous value of the temperature of the engine cooling liquid. At 35 there is indicated a pilot lamp which is lit when the coolant temperature exceeds the preselected value.

It is indicated generally at 36 a plural-way instrument which comprises a digital display indicated at 37 and a set of pushbuttons indicated at 38, 39, 40, 41, 42 and 43. Each pushbutton is operatively connected to a detecting instrument not shown in the drawing and which detects the function for which it has been prearranged.

By depressing the pushbutton 38 the display 37 will show the digital value corresponding to the total number of kilometers run by the car, by depressing the pushbutton 39, the display 37, again, will show the digital value of the used up fuel, by depressing the pushbutton 40 the display 37 will now display the digital value of the average speed in km/h, by depressing the pushbutton 41 the display 37 will show the digital value indicating the partial mileage made by the car, by depressing the pushbutton 42 the display 37 will now show the digital value indicating the prospective mileage of the car as a function of the instantaneous speed and the volume of fuel contained in the tank, by depressing the pushbutton 43 the display 37 will give the time in hours and minutes.

The pushbuttons 44 and 45 arranged on the panelboard 11 are intended to reset the hours and minutes on the time indication displayed on 37. By depressing the pushbutton 46 a few values are reset on the display 37, such as the digital value of the partial mileage and the digital value of the average speed. On the panel board 11 there are arranged a number of pilot symbols indicated at 47, 48, 49, 50, 51, 52, 53, 54, 55 operatively connected to detecting instruments not shown in the drawings.

The pilot symbol 47 is operatively connected to the control for lighting the dim lights and the optical electronic elements 47 are lit up when the driver acts on the light controls. At 48 there is indicated the pilot symbol of the DC generator and in this case the optical electronic elements 58 are lit up when the generator does not deliver a current sufficient to feed the devices on board vehicle. At 49 there is indicated the pilot symbol connected to the ventilation device for the vehicle interior and the electronic optical elements 59 are lit up when the device is on. At 50 there is shown the pilot symbol for the lights of the flashing indicators and the optical electronic elements 60 are lit up when the flashing indicators are flashing.

At 51 there is the pilot symbol which indicates the engine starting device and the optical electronic elements 61 are lit up when the device is on. The pilot symbol 52 indicates that the hand brake is on or off and the optical electronic elements 62 are lit up when the hand brake lever is on.

The pilot symbol 53 indicates if the headlights are on and the optical electronic elements 63 are lit up when the headlights are on.

The pilot symbol 54 indicates, by the illumination of the optical electronic elements 64, that the pressure of the fuel in the feed line is insufficient.

The pilot symbol 55 indicates, as the optical electronic elements 65 are on, that anomalous ignition takes place in the explosion chamber, such as preignition or knock.

The knob 66, placed on the panelboard 11 is connected to a rheostat which enables the driver to adjust at his choice the luminous intensity of the scales and displays of the various instrument and pilot symbols placed on the dashboard 10, so that the luminous intensity delivered by the various optical electronic elements does not disturb the driver's eyes.

The photoelectric resistor 67 placed on the panelboard 11 detects the variations of luminous intensity in the vehicle interior and automatically enters action to adjust the luminous intensity of the scales, displays and pilot symbols of the instruments of the dashboard 10.

The various scales and the displays placed on the panelboard 11 are each framed by fixed lids indicated at 20 which are substantially perpendicular to the panelboard plane: these lids have the task of offsetting light reflections which might render the readout inconvenient.

At 19 there is generally indicated a plate on which a printed circuit is formed and are mounted the electronic components useful for the operation of the optical electronic components. The resultant control circuit emits trains of pulses of current in the shape of rectangular waves at an appropriate frequency and the circuit and the components are not shown since they are of conventional make. The plate 19 as such which as assembled with the panelboard 11 carries the optical electronic elements of the different scales arranged on the panelboard 11.

Figure 2:
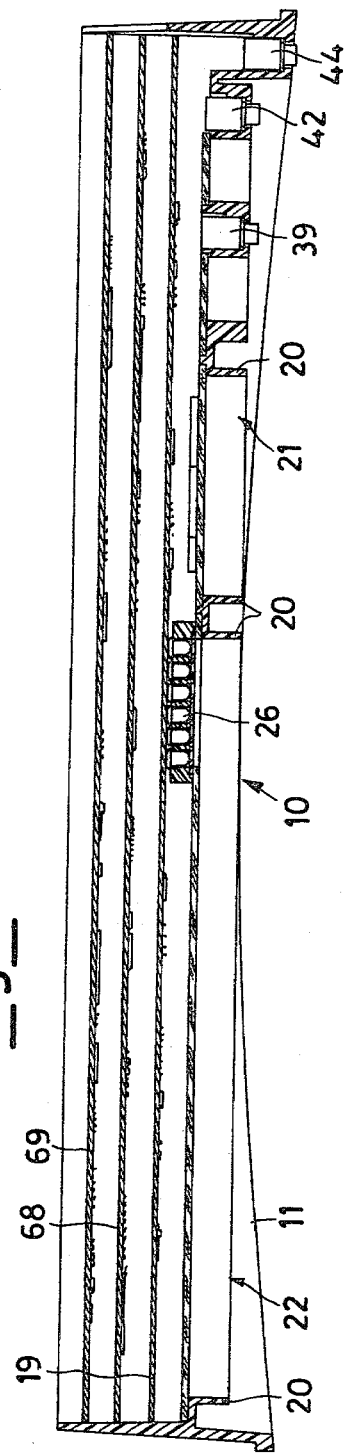
FIG. 2 is a side elevation view in cross-section taken along the line II—II of FIG. 1.

It is indicated at 68 a plate in which there are supported the logical circuitries which control the apparatus for adjusting the fuel feed and the engine ignition and at 69 there is shown a plate on which the power stages of said logical circuitries are supported. Also the plates 68 and 69 are assembled with the plate 19 and the panelboard 11 so as to form and entity as can be seen in FIGS. 2 and 3.

We claim:

1. A dashboard for a motor vehicles, said dashboard comprising a single panelboard including at least one speedometer scale with a pointer for indicating the speed of the vehicle and at least one engine RPM meter scale with a pointer for indicating the RPM of the vehicle engine, wherein said single panelboard further includes a number of control members and a first display controlled by said control members for selective indication of a corresponding number of measured physical magnitudes said speedometer having a bar-type scale partitioned into sectors, each sector comprising graduations of preselected values of the speed of the vehicle, the graduations of each sector being arranged staggered relative to those of the preceding sector.

2. A dashboard according to claim 1, wherein said RPM meter has a bar-type scale which is partitioned into sectors, each sector comprising graduations of preselected values of the rotational speed of the engine, the graduations of each sector being arranged staggered relative to those of the preceding sector.

3. A dashboard according to claim 2, wherein said single panelboard further includes a second display operatively connected to said speedometer and adapted to display a digital indication of the speed of the vehicle.

4. A dashboard according to claim 3, wherein said single panelboard further includes a scale of a pressure gauge with a pointer for indicating the engine oil pressure, a scale of a thermometer with a pointer for indicating the engine coolant temperature and a scale of a fuel level gauge with a pointer for indicating the fuel level in a fuel tank.

5. A dashboard according to claim 4, wherein said single panelboard further includes a number of pilot symbols combined with respective pilot indicators for preselected functions of the vehicle and the vehicle engine.

6. A dashboard according to claim 4, wherein said pressure gauge, said thermometer and said fuel level gauge have bar-type scales.

7. A dashboard according to claim 6, wherein said scales of the speedometer, the RPM meter, the pressure gauge, the thermometer and the fuel level gauge are superimposed to each other.

8. A dashboard according to claim 7, wherein said scales and said displays are framed by fixed ribs projecting substantially perpendicularly to the panelboard plane.

9. A dashboard according to claim 6, wherein each of said scales has a pointer formed by a set of optical electronic elements which are lit up in succession in variable number to indicate the instantaneous value of the corresponding physical magnitude, said optical electronic elements being actuated by control circuits operatively connected to measuring instruments, said optical electronic elements and said control circuits being supported by a first plate placed behind said panelboard and assembled therewith.

10. A dashboard according to claim 9, wherein said control circuits are arranged to emit trains of current pulses having rectangular waves of appropriate frequency and intensity.

11. A dashboard according to claim 9, wherein a second plate is placed adjacent said first plate, said second plate supporting logical circuits of apparatus for the adjustment of the fuel injection and of the ignition of the engine, a third plate supporting power stages of said logical circuits being located adjacent said second plate, said second and third plates being assembled with said first plate and said panelboard so as to make an entity therewith.

12. A dashboard according to claim 9, wherein said panelboard includes a light-sensitive probe for detecting the intensity of the light impinging on said panelboard from the interior of the vehicle, said probe being operatively connected to current feed means for said optical electronic elements so as to regulate the intensity of illumination of said elements consistently with the light conditions in the interior of the vehicle.

* * * * *